US010951542B2

(12) United States Patent
Meck et al.

(10) Patent No.: US 10,951,542 B2
(45) Date of Patent: *Mar. 16, 2021

(54) METHOD FOR MANAGING OPERATIONAL SCHEDULES OF CLOUD-BASED SYSTEMS

(71) Applicant: Capital One Services, LLC, McLean, VA (US)

(72) Inventors: Ron Meck, Toano, VA (US); James Laiche, Richmond, VA (US); Daniel Eisenberg, Brooklyn, NY (US); Jacob Walden, North Chesterfield, VA (US); Tianzhen Lin, Fairfax, VA (US); Chienyi Hung, New York, NY (US); Mamadou Balde, Arlington, VA (US); Celik Sismanturk, Astoria, NY (US); Jason McGinthy, Glen Allen, VA (US); Scott Foreman, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,266

(22) Filed: Oct. 22, 2019

(65) Prior Publication Data
US 2021/0021538 A1 Jan. 21, 2021

Related U.S. Application Data

(63) Continuation of application No. 16/511,501, filed on Jul. 15, 2019, now Pat. No. 10,498,665.

(51) Int. Cl.
G06F 15/173 (2006.01)
H04L 12/911 (2013.01)
(Continued)

(52) U.S. Cl.
CPC .......... *H04L 47/70* (2013.01); *G06F 16/9035* (2019.01); *G06F 16/953* (2019.01); *H04L 67/02* (2013.01)

(58) Field of Classification Search
CPC .... G06F 16/951; G06F 16/953; G06F 16/903; G06F 16/9035
(Continued)

(56) References Cited

U.S. PATENT DOCUMENTS

2015/0263983 A1* 9/2015 Brennan ............. H04L 41/5045
709/226
2018/0124158 A1* 5/2018 Amento ............. H04L 41/0806

* cited by examiner

*Primary Examiner* — Hee Soo Kim
(74) *Attorney, Agent, or Firm* — Kacvinsky Daisak Bluni PLLC

(57) ABSTRACT

Techniques for managing cloud-based systems are provided. A user provides search criteria for cloud-based resources through a web-based user interface. A search for the cloud-based resources is conducted based on the search criteria. The web-based interface displays a listing of cloud-based resources matching the search criteria. The user provides an input indicating a request to keep awake a first cloud-based resource. In response, the web-based interface copies an original operating schedule for the first cloud-based resource into a first tag and modifies the original operating schedule contained within a second tag to form a modified operating schedule to cause the cloud-based resource to keep awake. The user can restore the original operating schedule when desired. Alternatively, the web-based interface can automatically restore the original operating schedule when a predetermined time period expires.

17 Claims, 10 Drawing Sheets

(51) Int. Cl.
*G06F 16/9035* (2019.01)
*G06F 16/953* (2019.01)
*H04L 29/08* (2006.01)

(58) Field of Classification Search
USPC .......................................................... 709/226
See application file for complete search history.

Storage Medium 800

Computer Executable Instructions for 200

FIG. 8

METHOD FOR MANAGING OPERATIONAL SCHEDULES OF CLOUD-BASED SYSTEMS

RELATED APPLICATIONS

This application is a continuation of U.S. patent application Ser. No. 16/511,501, now U.S. Pat. No. 10,498,665, titled "METHOD FOR MANAGING STATE OF CLOUD-BASED SYSTEMS" filed on Jul. 15, 2019. The contents of the aforementioned patent are incorporated herein by reference.

TECHNICAL FIELD

Embodiments described herein generally relate to managing cloud-based resources.

BACKGROUND

Many cloud-based systems are scheduled to shut down during periods of low activity such as at night. When a user desires to perform maintenance on an inactive cloud-based system, the user is typically required to locate the cloud-based system and to turn it on. Such a process is time-consuming and inefficient. Further, even after the cloud-based system is turned on it may automatically turn off according to a set schedule even as the user is performing maintenance. Accordingly, what is needed is a more efficient management of cloud-based resources to enable a user to more effectively perform maintenance on the cloud-based resources.

SUMMARY OF THE DISCLOSURE

This disclosure presents various systems, components, and methods related to managing cloud-based systems or resources. Each of the systems, components, and methods disclosed herein provides one or more advantages over conventional systems, components, and methods.

Various embodiments include techniques for managing cloud-based systems or resources. A user can provide search criteria for cloud-based resources through a web-based user interface. A search for the cloud-based resources can be conducted based on the received search criteria. The web-based user interface can display a listing of cloud-based resources matching the received search criteria. The user can provide an input indicating a request to keep awake a first cloud-based resource matching the received search criteria. In response, the web-based user interface can copy an original operating schedule for the first cloud-based resource into a first tag associated with the first cloud-based resource and can store the first tag in a storage device. The web-based user interface can then modify the original operating schedule contained within a second tag associated with the first cloud-based resource to form a modified operating schedule to cause the cloud-based resource to keep awake. The user can then restore the original operating schedule when desired. Alternatively, the web-based user interface can automatically restore the original operating schedule for the first cloud-based resource when a predetermined time period expires.

The web-based user interface enables a user to quickly and efficiently locate one or more cloud-based systems based on user-supplied search criteria. Further, the web-based user system provides automatic adjustment of the operating schedule of the one or more cloud-based systems based on an input from the user indicating a desire to keep the one or more cloud-based systems awake. The user, for example, can then perform maintenance on the one or more cloud-based systems without fear of the systems shutting down and without the need to adjust the schedule of each system individually. Other embodiments are also disclosed and described.

BRIEF DESCRIPTION OF THE DRAWINGS

FIG. 8 illustrates a storage medium.

DETAILED DESCRIPTION

Figure 1:
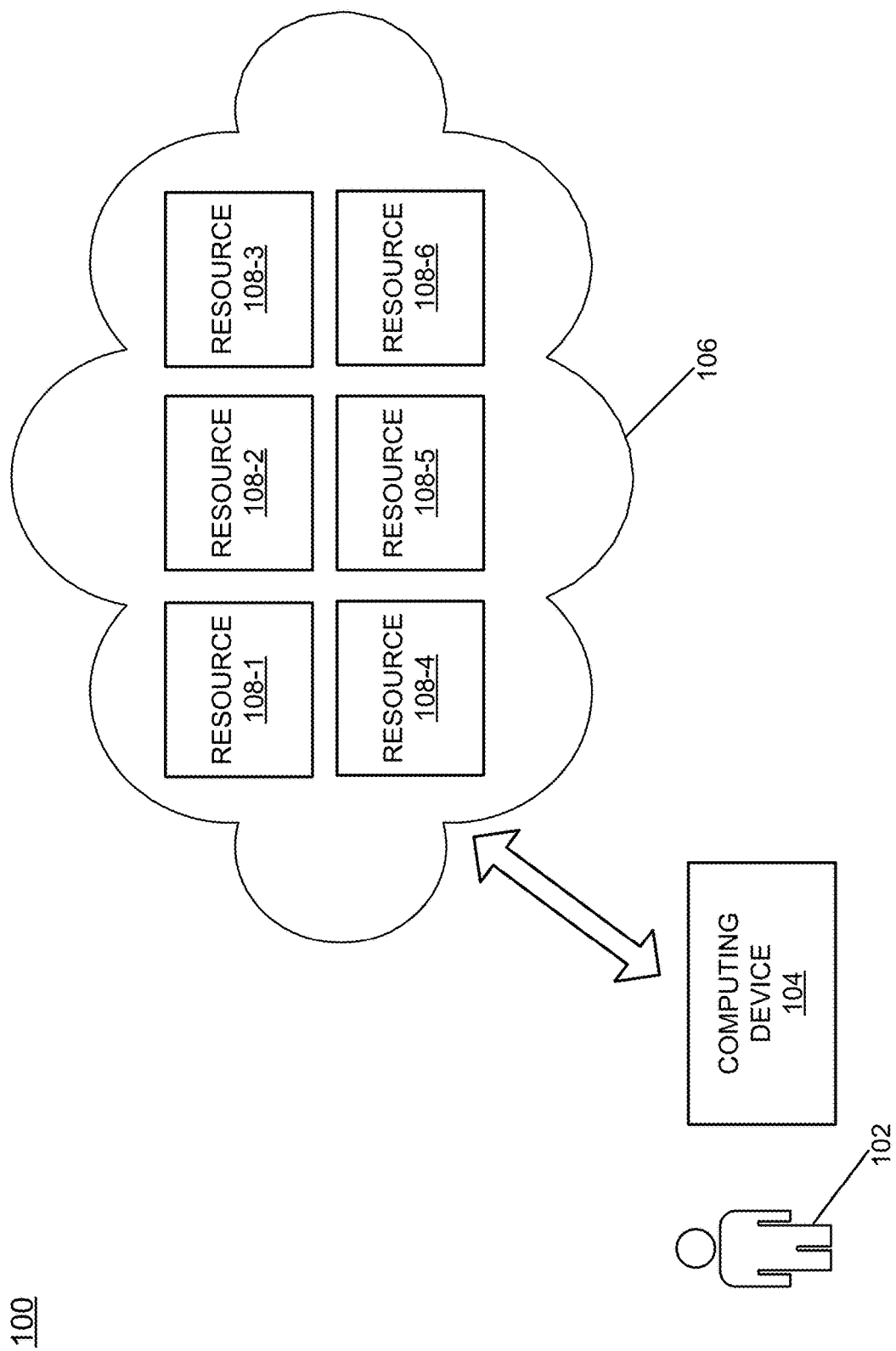
FIG. 1 illustrates an operating environment.

FIG. 1 illustrates an operating environment 100 such as may be representative of various embodiments in which techniques for managing cloud-based resources may be implemented. As shown, the operating environment can include a user 102, a computing device 104, a cloud platform or network 106, and cloud-based resources 108. The user 102 can use the computing device 104 to manage the cloud-based resources 108 as described herein. The cloud-based resources 108 can be cloud-based instances or cloud-based servers operating or available through the cloud network 106. In various embodiments, the cloud network 106 can be a virtual private cloud (VPC). In various embodiments, the cloud-based resources 108 can include application(s), services, storage resources, memory resources, processing resources, and so forth available to a remote user through the cloud network 106.

The operating environment 100 is shown as including a first cloud-based resource 108-1, a second cloud-based resource 108-2, a third cloud-based resource 108-3, a fourth cloud-based resource 108-4, a fifth cloud-based resource 108-5, and a sixth cloud-based resource 108-6 but is not so limited. In general, the operating environment 100 can include any number of cloud-based resources 108.

The computing device 104 can be any type of computing device including, for example, a desktop computer, a mobile computing device, a tablet, or a smartphone. The computing device 104 can provide a web-based interface via a graphical user interface (GUI) to the user 102 that can be used to collect information regarding the cloud-based resources 108 and/or to manage operation of the cloud-based resources 108. The web-based interface can be restricted to certain authorized users. Accordingly, in various embodiments, the user 102 can be required to enter authorization credentials (e.g., a username and password) to access the web-based interface. The web-based interface can be provided through the cloud network 106 or another remote computing device and/or network and presented to the user 102 for use or manipulation by the user 102 on the computing device 104.

The web-based interface provided by the computing device 104 can allow the user 102 to provide identification information for each of the cloud-based resources 108. For example, the user 102 may provide a primary identifier and a secondary identifier for each cloud-based resource 108. The primary and secondary identifiers may be primary and secondary tag values. The primary and secondary identifiers can be selected from a set of pre-defined keys or values. The primary and secondary identifiers can be stored and associated with particular cloud-based resources 108 and can be considered to be stored tag identifiers. At least one of the primary or secondary tag identifiers for a particular cloud-based resource 108 can be customized or specified previously by the user. For example, the cloud-based resource 108-2 can include a group tag of "test group A" such that a search for "test group A" in field 304 will return the cloud-based resource 108-2. The tag identifiers for the cloud-based resources 108 can be stored (e.g., in a database), can be associated with certain cloud-based resources 108, and can be compared to provided search criteria to find any matches as described herein.

The web-based interface provided by the computing device 104 can allow the user 102 to search for specific cloud-based resources 108 based on the primary and/or secondary identifiers. For example, the web-based interface may provide search criteria for the cloud-based resources 108. The search criteria can comprise the primary and/or secondary identifiers. The web-based interface can then search for cloud-based resources 108 that match the search criteria provided by the user 102—for example, a first primary identifier and a first secondary identifier entered by the user 102.

As an example, the user 102 can provide a first primary identifier and a first secondary identifier to the web-based interface as search criteria. The web-based interface can then cause a search of the cloud-based resources 108 to be made based on the provided search criteria. The web-based interface can display a listing of the cloud-based resources 108 that match the provided search criteria. The listing of the cloud-based resources 108 that match the received search criteria can include additional information on each cloud-based resource 108 meeting the received search criteria. For example, each listed cloud-based resource 108 can include information such as an instance identifier or resource identifier, an instance name or a resource name, a current operational state of each cloud-based resource (e.g., running or not running), and a schedule type for each cloud-based resource matching the search criteria (e.g., always on or subject to routine downtime).

The web-based interface provided by the computing device 104 can allow the user 102 to select one or more listed cloud-based resources 108 to keep active or keep awake. For example, if the one or more listed cloud-based resources 108 are currently not running or are scheduled to turn off or not run within a time period that it is desired to keep the one or more listed cloud-based resources 108 running, the user 102 can direct the cloud-based resources 108 to keep awake. By selecting to keep awake the one or more listed cloud-based resources 108, the user 102 can be allowed to work on or with the cloud-based resources 108 without fear that they may stop running.

When the user 102 selects a listed cloud-based resource 108 to keep awake, the web-based interface can operate to cause an operational schedule (e.g., an original operational schedule) of the selected cloud-based resource 108 to be copied and stored—for example, from a first tag into a second tag. The web-based interface can then cause the operational schedule for the selected cloud-based resource 108 to be modified—for example, to be modified to keep awake. In various embodiments, the operational schedule can be modified to keep awake the selected cloud-based resource 108 indefinitely, for a first desired period of time specified by the user, or for a period of time not to exceed a predetermined time interval (e.g., 12 hours or 24 hours).

The selected cloud-based resource 108 can then operate according to the newly modified operational schedule. For example, the selected cloud-based resource 108 can keep awake until the user 102 restores the original operation schedule or until the expiration of the predetermined time interval. Under either scenario, the original operation schedule can be copied from the second tag back into the first tag—thereby restoring the operational schedule of the selected cloud-based resource 108 to the original, pre-modified operational schedule. The selected cloud-based resource 108 can then return to normal operational.

In various embodiments, if any listed cloud-based resources 108 meeting the search criteria is not running, the web-based interface can cause the cloud-based resource 108 to start-up or to begin running. In various embodiments, when the user 102 modifies an original operating schedule for any cloud-based resource 108, the web-based interface can automatically notify other authorized users of the change to the original operating schedule.

The web-based interface provided through the computing device 104 enables a user 102 (e.g., a developer) to quickly and efficiently search for cloud-based resources 108. Further, the web-based interface enables the user to efficiently start up shutdown resources 108 that the user may want online (e.g., to work on a project or maintenance issue related to the shutdown resource 108). The web-based interface solves the problem of software developers having to track down system engineers who have access to bring online stopped or shutdown cloud-based resources 108 after normal working hours so that the software developer can work on a project involving the shutdown resource 108 after normal working hours. With the web-based interface, the software developer can self-service her own cloud-based resources 108 and bring them online without any assistance from another team member or resource. In this way, an automated solution to locating and bringing online a desired cloud-based resource 108 can be provided while avoiding the prior need in conventional approaches of having to bring each resource online one at a time.

Figure 2:
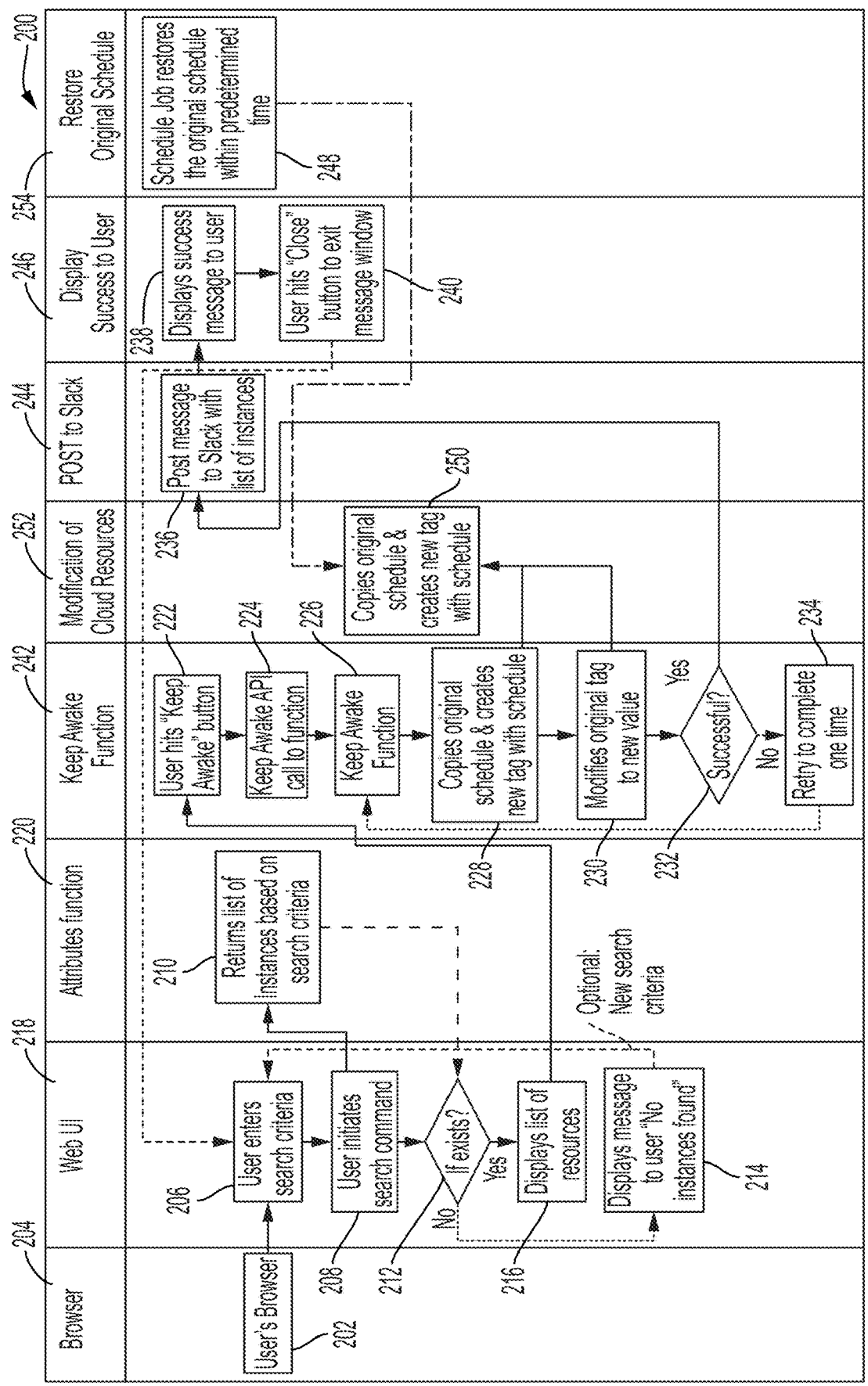
FIG. 2 illustrates a logic flow.

FIG. 2 illustrates an example of a logic flow 200 that may be representative of techniques for managing cloud-based resources. For example, the logic flow 200 may be representative of operations that may be performed in various embodiments by one or more of the constituent components of the operating environment 100 depicted in FIG. 1.

At 202, a user engages a web browser. The web browser can provide the user with access to a web-based interface in a GUI on a display device for managing cloud-based resources. In various embodiments, the web browser can be provided by the computing device 104, and the web-based interface can be provided by a remote computing device that is associated with the cloud-based resources 108.

Figure 3:
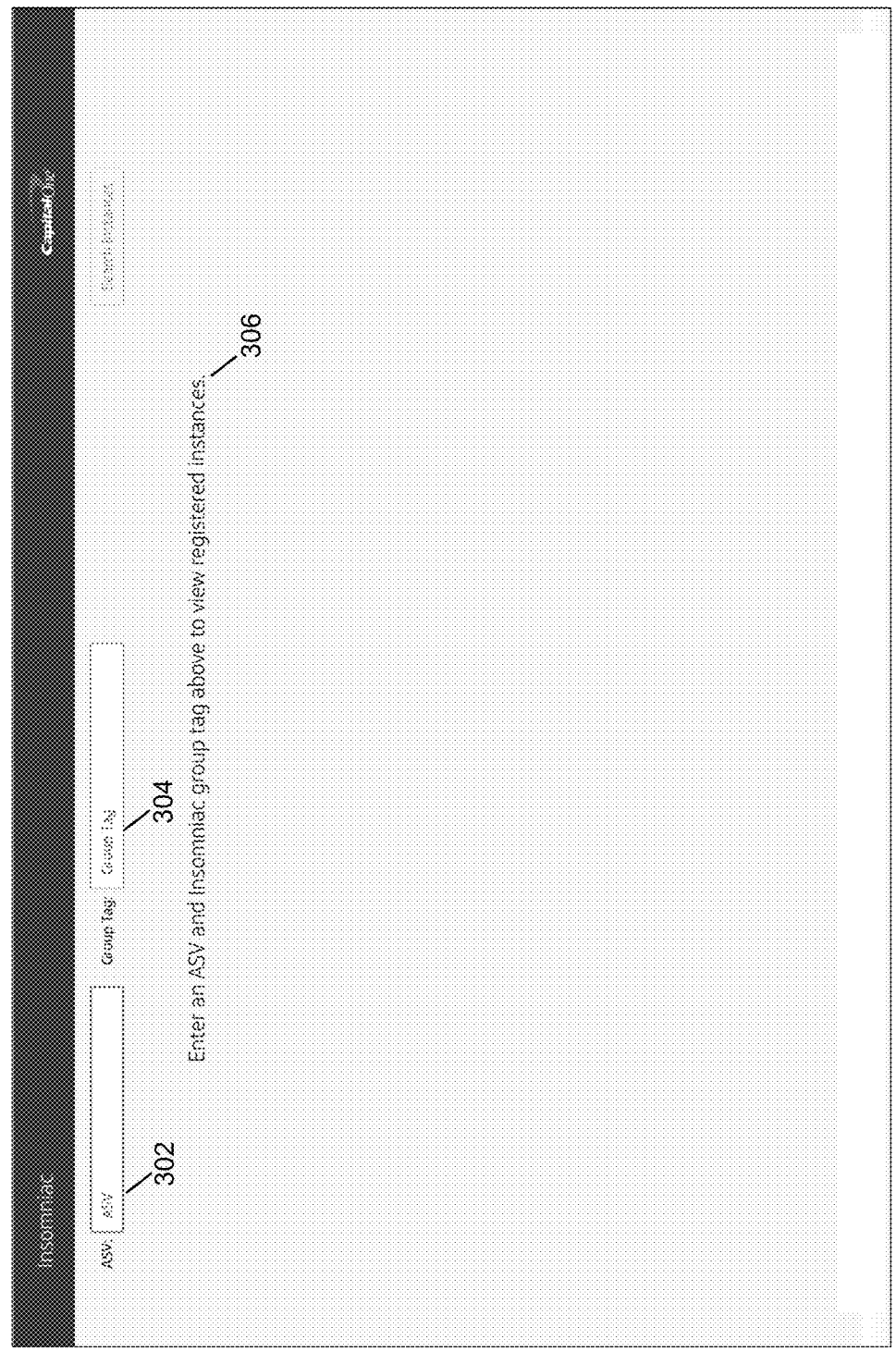
FIG. 3 illustrates a first user interface.

FIG. 3 illustrates a first user interface or screen 300 of the web-based interface provided to the user through the web browser. As shown in FIG. 3, the first user interface 300 can include a first field 302 and a second field 304 in which the user can enter search criteria. In various embodiments, the first field 302 can be associated with data entries that relate to application servers or active services (ASV) and the second field 304 can be associated with data entries that relate to group tags. In various embodiments, the first field 302 can search for cloud-based resources 108 based on a primary tag or identifier and the second field 304 can search for cloud-based resources 108 based on a secondary tag or identifier. In various embodiments, the second field 304 can be used to specify custom tag identifiers that may be associated with a particular cloud-based resource 108. As further shown in FIG. 3, the first user interface 300 can include an instruction 306 for the user.

As shown in FIG. 2, the initial interaction with the web-based interface by the user can be considered to be an initial browser interaction 204.

At 206, the user can provide search criteria. The user can provide the search criteria through the web browser. The search criteria can be search criteria for one or more cloud-based resources. In turn, the computing device or other device providing the web-based interface can receive the search criteria for the cloud-based resources from the user through the web-based interface provided through the browser.

As an example, the search criteria can include a first component and a second component. The first component can be a keyword or other identifier used to identify a particular cloud-based resource or group resources. The second component can also be a keyword or other identifier used to further identify a particular cloud-based resource or group of resources. Keywords or other identifiers previously associated with a specific cloud-based resource can be compared to the provided search criteria. When there is a match between any associated keyword or identifier for a particular resource and any portion of the search criteria, then the resource can be included in the list of returned search results. In this way, the search results can include multiple cloud-based resources for review by the user.

Figure 4:
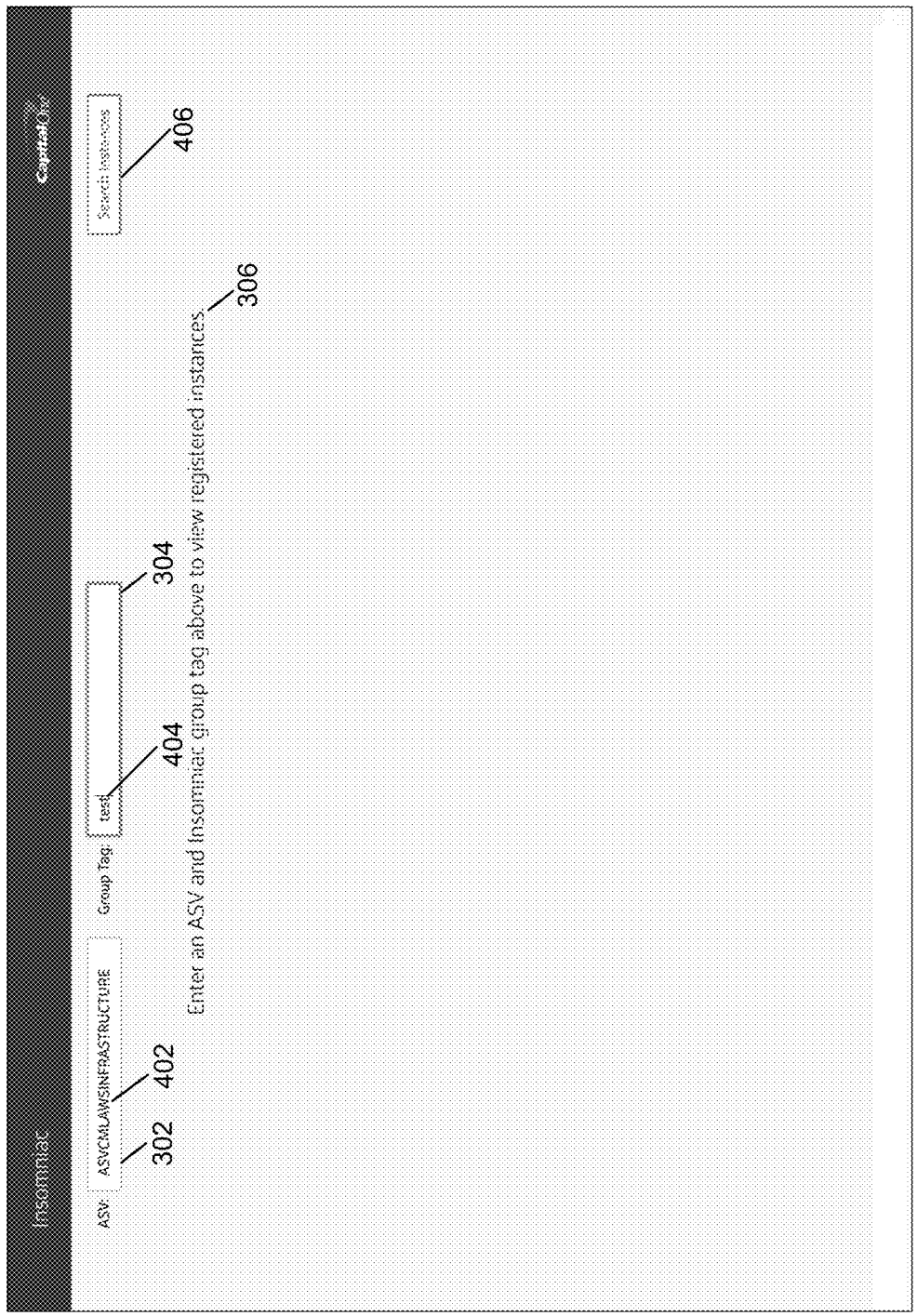
FIG. 4 illustrates a second user interface.

FIG. 4 illustrates a second user interface or screen 400 of the web-based interface provided to the user through the web browser. As shown in FIG. 4, the user enters first search criteria 402 into the first field 302 and enters second search criteria 404 into the second field 304. In various embodiments, the first search criteria 402 can relate to a primary tag value or identifier of a cloud-based resource and the second search criteria 404 can relate to a secondary tag value or identifier of a cloud-based resource.

After the user provides the first and second search criteria 402 and 404, the second user interface 400 can provide the user with a user interaction component 406 for implementing a search. In various embodiments, the user interaction component 406 can be a clickable or selectable button. By selecting the user interaction component 406, the user can request a search for cloud-based resources to be conducted based on the provided first and second search criteria 402 and 404.

At 208, the user initiates a search by selecting the search command provided by the user interaction component 406. In turn, the computing device or other device providing the web-based interface can search for the cloud-based resources based on the received search criteria (e.g., based on the first and second search criteria 402 and 404).

At 210, a determination can be made as to whether any cloud-based resources meeting the provided search criteria exist. As an example, identifiers for each resource can be compared to the search criteria to determine if there are any matches. Accordingly, the web-based interface can generate and return a list of instances that match or meet the search criteria. If at 212 it is determined that no cloud-based resource meets the provided search criteria (i.e., the list of instances that match the search criteria does not exist or is a null set), then at 214 the web-based interface through the web browser can display a message to the user that no cloud-based resources were found (e.g., by displaying a message of "No instances found" or the like). The user can then optionally enter new search criteria to conduct a subsequent search for cloud-based resources if desired.

If at 212 it is determined that one or more cloud-based resources meet the provided search criteria (i.e., the list of instances that match the search criteria does exist or includes one or more results), then at 216 the web-based interface through the web browser can display to the user a listing of cloud-based resources matching the received search criteria.

Figure 5:
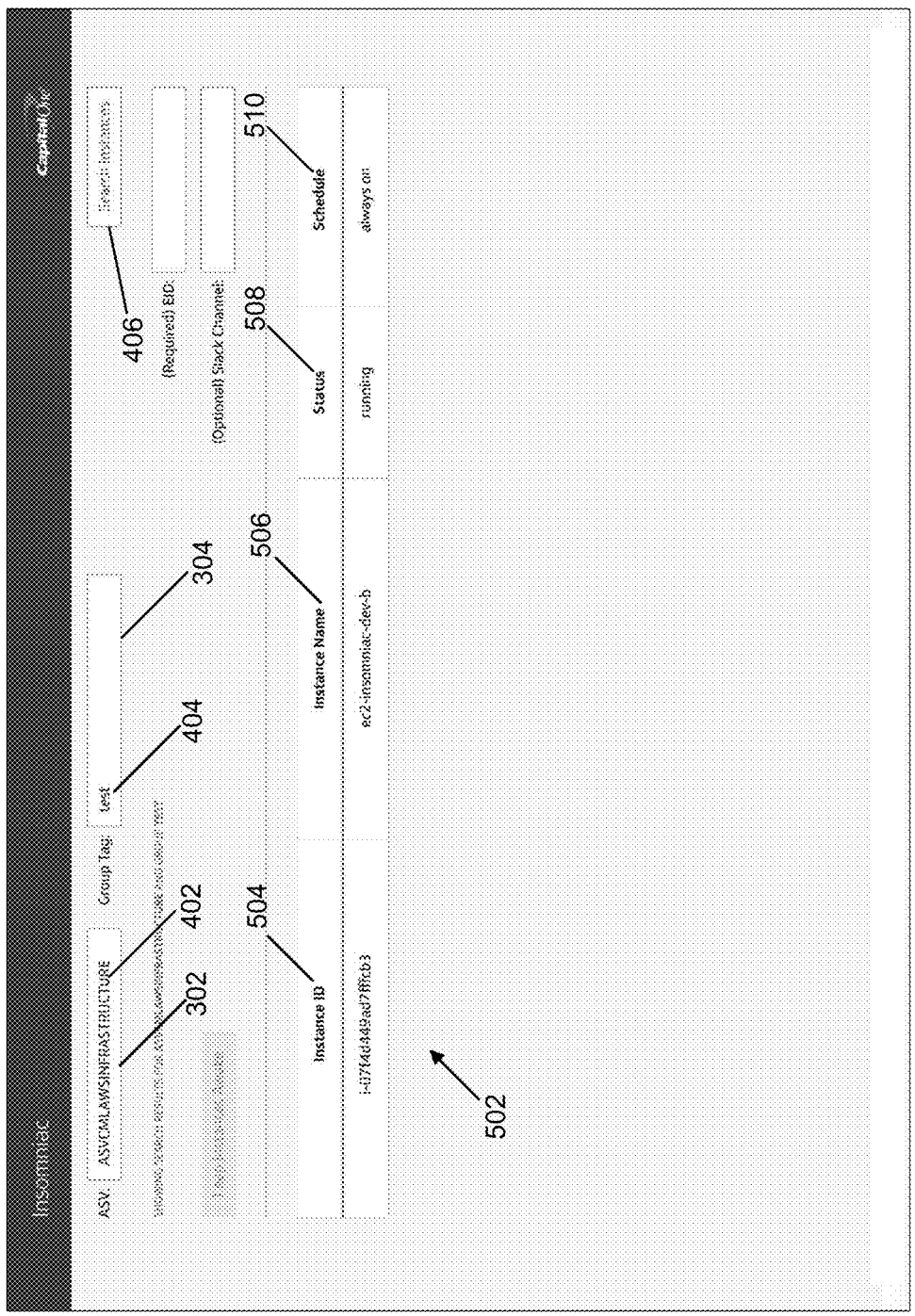
FIG. 5 illustrates a third user interface.

FIG. 5 illustrates a third user interface or screen 500 of the web-based interface provided to the user through the web browser. As shown in FIG. 5, the web-based interface displays to the user a listing 502 of cloud-based resources matching the received search criteria. The listing 502 of the cloud-based resources matching the received search criteria can specify each cloud-based resource by an instance identifier 504 (e.g., an identification code of the resource), an instance name 506 (a name of the resource), a current operational state or status 508 (e.g., running or not running), and/or a schedule type 510 (e.g., always on or subject to scheduled downtime). If the current operational status 508 shows that a resource is not running, then the web-based interface described herein can automatically start an instance of the resource. If the schedule type 510 shows that the resource is scheduled for periodic downtown, then an instance of the resource may be needed to stay on as described by the user in accordance to the techniques described herein. The listing 502 allows the user to efficiently locate any desired cloud-based resource that the user searched for by supplying the search criteria.

As shown in FIG. 2, the interaction with the web-based interface by the user to specify search criteria and to receive displayed results can be considered to be a web-based user interface (UI) interaction 218. The search for cloud-based resources meeting the provided search criteria (e.g., labeled as 210) can be implemented by an attributes function 220 of the web-based interface. The attributes function can search for cloud-based resources that match the received search criteria.

At 222, the user can specify to the web-based interface through the web browser to keep one or more of the listed cloud-based resources awake. Accordingly, at 222, the web-based interface can receive an input from the user through the web-based user interface, with the input indicating a request to keep awake at least a first cloud-based resource matching the received search criteria.

Figure 6:
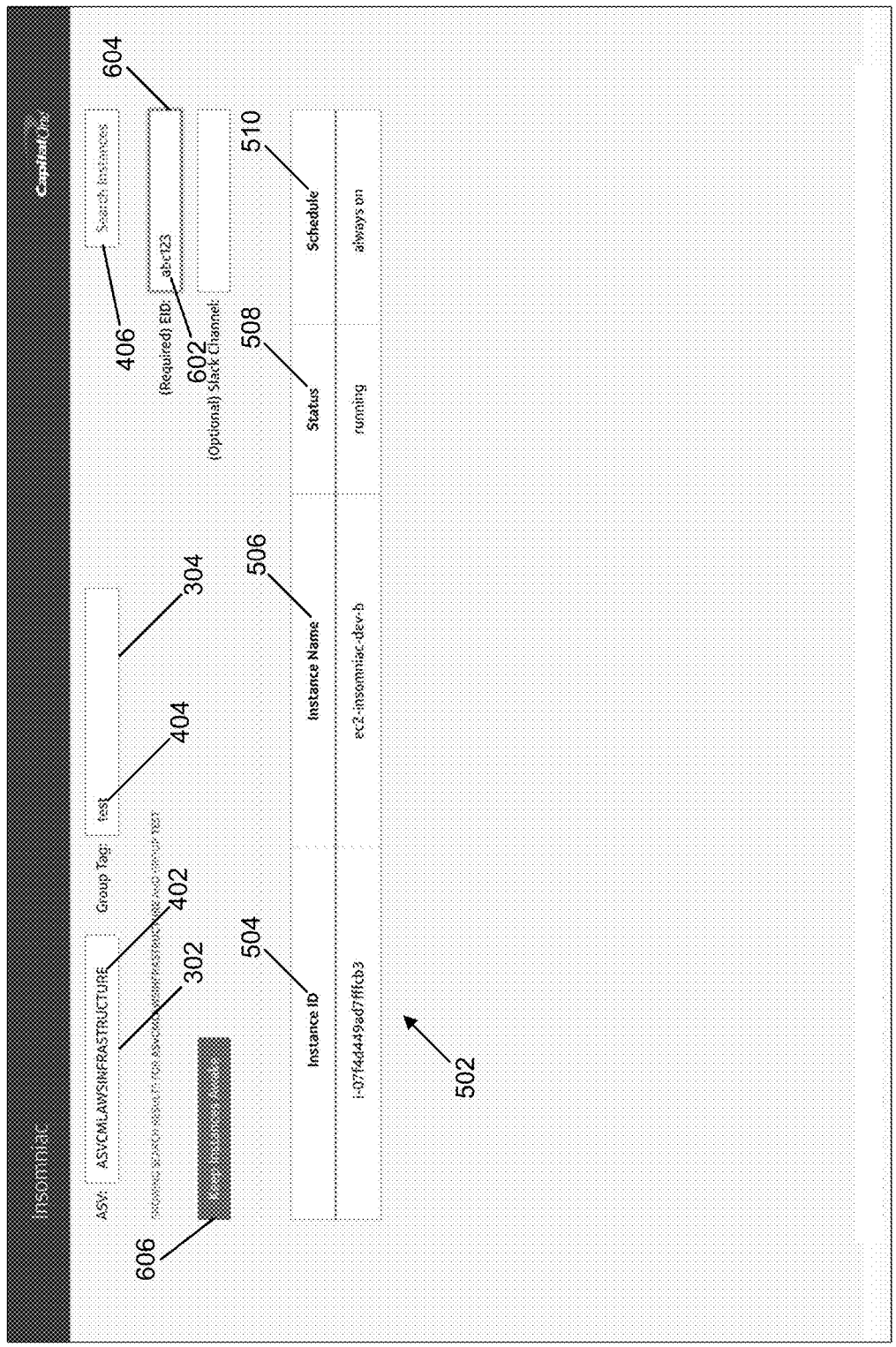
FIG. 6 illustrates a fourth user interface.

FIG. 6 illustrates a fourth user interface or screen 600 of the web-based interface provided to the user through the web browser. As shown in FIG. 6, the user can enter a password or other authentication or user verification code 602 into a field 604 presented to the user. In various embodiments, the user may be required to provide a code or identifier to enable the user to take any further action in relation to any cloud-based resource provided in the listing 502.

After the user provides the authorization information 602 in the field 604, the fourth user interface 500 can provide the user with a user interaction component 606 for requesting a cloud-based resource in the listing 502 to remain awake or active (e.g., up and running). In various embodiments, the user interaction component 606 can be a clickable or selectable button. By selecting the user interaction component 606, the user can request to keep awake a cloud-based resource matching the search criteria. In this manner, the web-based interface can receive an input from the user through the web browser, with the input indicating a request to keep awake a first cloud-based resource matching the received search criteria. The web-based interface can then perform operations to fulfill the user request as described herein.

At 224, an application programming interface (API) function call can be made. The function call can relate to the "Keep Awake" request made by the user at 222—for example, in response to the user input received at 222. At 226, the function for keeping awake the first cloud-based resource can be implemented.

As a first step, at 228, a copy of an original operating schedule for the first cloud-based resource can be made. The copy of the original operating schedule can be placed into a first tag associated with the first cloud-based resource. The first tag containing a copy of the original operating schedule can then be stored in a storage device (e.g., a memory storage component).

As a subsequent step, at 230, modification of the original operating schedule can be made. A second tag associated with the first cloud-based resource (e.g., an original tag) can contain the original operating schedule. The original operating schedule can be modified to form a modified operating schedule to cause the cloud-based resource to keep awake—for example, up and running. In various embodiments, the operating schedule for the first cloud-based resource can be modified in a manner to keep the first cloud-based resource awake for an indefinite period of time (e.g., until the user further modifies the operating schedule). In various embodiments, the operating schedule for the first cloud-based resource can be modified in a manner to keep the first cloud-based resource awake for a predetermined period of time (e.g., 6 hours, 12 hours, 24 hours, etc.). In various embodiments, at the expiration of the predetermined period of time, the modified schedule can automatically revert back to the original operating schedule.

By modifying the original operating schedule—for example, by modifying data or other information in the tag associated with the first cloud-based resource—the cloud-based resource identified by the user can be maintained to be active over a time the user may use the resource. Further, by copying the original operating schedule—for example, by storing it within another tag associated with the first cloud-based resource—the original operating schedule can be restored at a time specified by the user or at the expiration of a predetermined time period.

In various embodiments, the function call at 224 can turn on or activate a cloud-based resource if the resource is not awake. Further, in various embodiments, as described herein, the web-based interface can restore the original operating schedule for the first cloud-based resource when a predetermined time period expires.

After storing and modifying the original operating schedule for the cloud-based resource, a determination can be made at 232 whether the adjustment to the operating schedule of the cloud-based resource was successful. If the attempt to adjust the operating schedule was not successful, then at 234 the web-based interface and/or the user can retry the modification. In various embodiments, retrying to modify the operating schedule can entail implementing the keep awake function at 226.

If the attempt to adjust the operating schedule was successful, then at 236 a set of users can be notified that the operating schedule for the first cloud-based resource has been modified. In various embodiments, notification can include any form of communication including transmitting a text message or email and/or posting a message to a shared communication resource (e.g., posting a message to a Slack channel).

At 238, the web-based interface can display to the user through the web browser a communication indicating that modification of the original operating schedule of the first cloud-based resource was successful.

Figure 7:
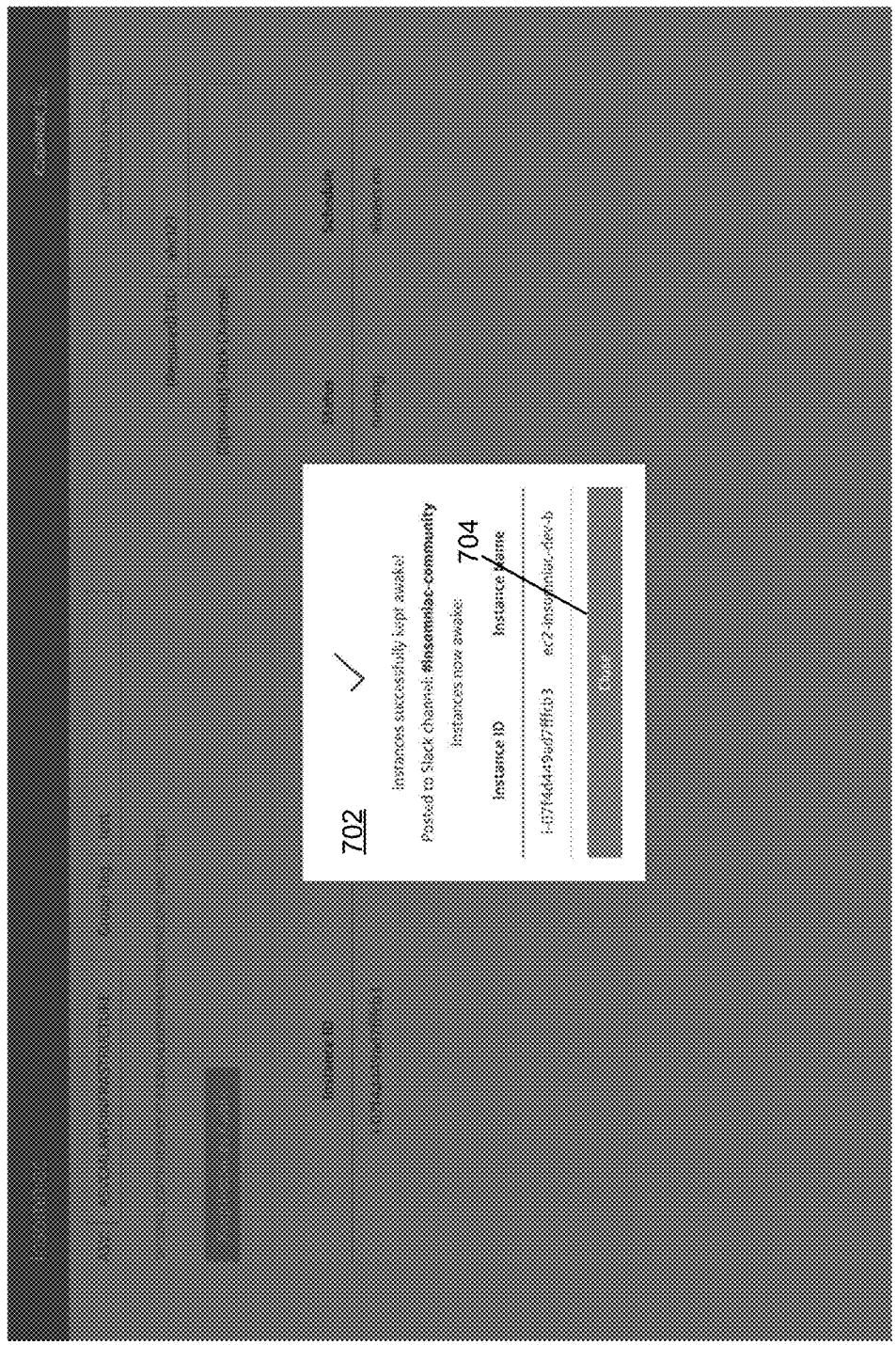
FIG. 7 illustrates a fifth user interface.

FIG. 7 illustrates a fifth user interface or screen 700 of the web-based interface provided to the user through the web browser. As shown in FIG. 7, the user interface 700 includes a displayed message 702. The displayed message 702 can provide information regarding the modification of the original operating schedule of the first cloud-based resource including an indication that the modification was successful. The displayed message 702 can further include a user interaction component 704 for exiting or closing the displayed message 702. In various embodiments, the user interaction component 704 can be a clickable or selectable button.

At 240, the user can close the message displayed at 238—for example, the user can click on the user interaction component 704 to exit from the displayed message 702.

As shown in FIG. 2, 222-234 can be considered to be part of operations related to a keep awake function or sequence of actions 242 implemented or initiated by the web-based interface. Notifying other users or individuals at 236 can be considered to be a notification 244 by the web-based interface. Further, 238 and 240 can be considered to be part of a success notification 246 by the web-based interface.

As disclosed herein, the web-based interface in various embodiments can automatically change the operating schedule for the first cloud-based resource back to the original operating schedule. In various embodiments, the restoration of the original operating schedule can be scheduled as a job to perform at the expiration of a predetermined time period—for example, either a fixed time period or a user-selectable time period. At 248, the web-based interface can implement or initiate restoring the original operating schedule for the first cloud-based resource.

At 250, modification of the operating schedule for the cloud-based resource can be represented. The modification can be for changing the original schedule to a new modified schedule or changing the modified schedule back to the original schedule. Accordingly, FIG. 2 represents these possible modifications as modification of cloud resources 252. Further, FIG. 2 shows that changing the operating schedule back to the original schedule can be considered to be restoring the original schedule 254 of the cloud-based resource. As described herein, the user can initiate restoration of the original operating schedule by, for example, providing an additional input to the web-based user interface.

FIG. 8 illustrates a storage medium 800. The storage medium 800 can comprise any non-transitory computer-readable storage medium or machine-readable storage medium. In various embodiments, the storage medium 800 can comprise a physical article of manufacture. In various embodiments, storage medium 800 can store computer-executable instructions, such as computer-executable instructions to implement one or more of logic flows or operations described herein, such as the logic flow 200 of FIG. 2. In various embodiments, storage medium 800 can store computer-executable instructions, such as computer-executable instructions to implement any of the features or functions of any of the components described in FIG. 1. Examples of a computer-readable storage medium or machine-readable storage medium can include any tangible media capable of storing electronic data. Examples of computer-executable instructions can include any type of computer readable code.

Figure 9:
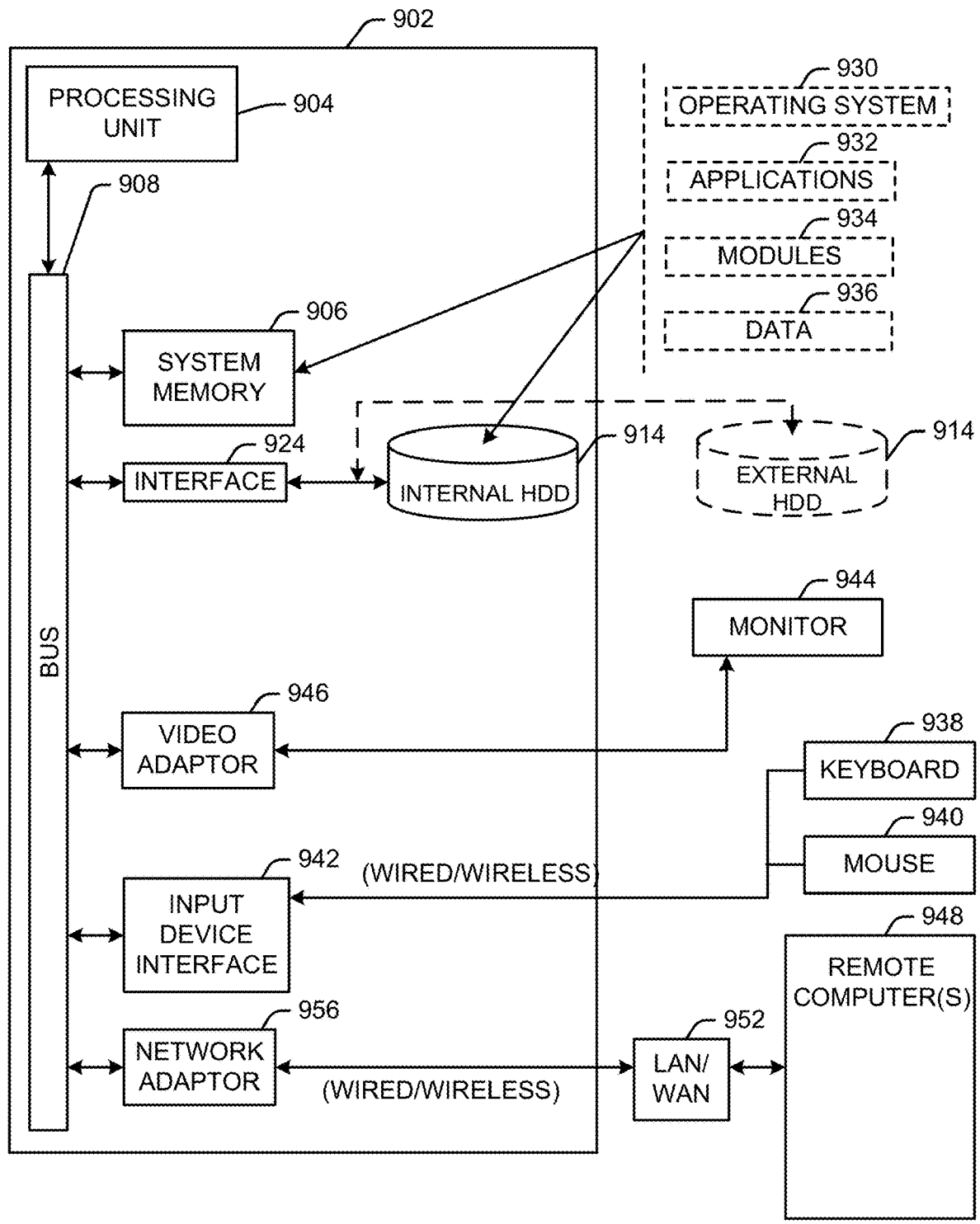
FIG. 9 illustrates a computing architecture.

FIG. 9 illustrates a computing architecture 900 that can implement various embodiments described herein. In various embodiments, the computing architecture 900 can comprise or be implemented as part of an electronic device. In various embodiments, the computing architecture 900 can represent an implementation of the computing device 104 and/or any device providing the web-based interface described herein. One or more of the constituent components of the operating environment 100 can be implemented in hardware, software, or any combination thereof including implementation based on a storage device (e.g., a memory unit) and logic, at least a portion of which is implemented in circuitry and coupled to the storage device. The logic can be or can include a processor or controller component.

The computing architecture 900 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 9, the computing architecture 900 can comprise a computer 902 having a processing unit 904, a system memory 906 and a system bus 908. The processing unit 904 can be any of various commercially available processors or can be a specially designed processor.

The system bus 908 provides an interface for system components including, but not limited to, an interface between the system memory 906 and the processing unit 904. The system bus 908 can be any of several types of bus structure that may further interconnect to a memory bus (with or without a memory controller), a peripheral bus, and a local bus using any of a variety of commercially available bus architectures.

The system memory 906 can include any type of computer-readable storage media including any type of volatile and non-volatile memory. The computer 902 can include any type of computer-readable storage media including an internal (or external) hard disk drive (HDD) 914. In various embodiments, the computer 902 can include any other type of disk drive such as, for example, a magnetic floppy disk and/or an optical disk drive. The HDD 914 can be connected to the system bus 908 by a HDD interface 924.

In various embodiments, any number of program modules can be stored in the drives and memory units 906 and/or 914 such as, for example, an operating system 930, one or more application programs 932, other program modules 934, and program data 936.

A user can enter commands and information into the computer 902 through one or more wired/wireless input devices such as, for example, a keyboard 938 and a pointing device, such as a mouse 940. These and other input devices can be connected to the processing unit 904 through an input device interface 942 that is coupled to the system bus 908. A monitor 944 or other type of display device can also be connected to the system bus 908 via an interface, such as a video adaptor 946. The monitor 944 may be internal or external to the computer 902.

The computer 902 may operate in a networked environment using logical connections via wired and/or wireless communications to one or more remote computers, such as a remote computer 948. The remote computer 948 can be a workstation, a server computer, a router, a personal computer, portable computer, microprocessor-based entertainment appliance, a smartphone, a tablet, a peer device or other common network node, and typically includes many or all of the elements described relative to the computer 902. The logical connections depicted include wired and/or wireless connectivity to networks 952 such as, for example, a local area network (LAN) and/or larger networks, for example, a wide area network (WAN). Networks 952 can provide connectivity to a global communications network such as, for example, the Internet. A network adapter 956 can facilitate wired and/or wireless communications to the networks 952. The computer 902 is operable to communicate over any known wired or wireless communication technology, standard, or protocol according to any known computer networking technology, standard, or protocol.

Figure 10:
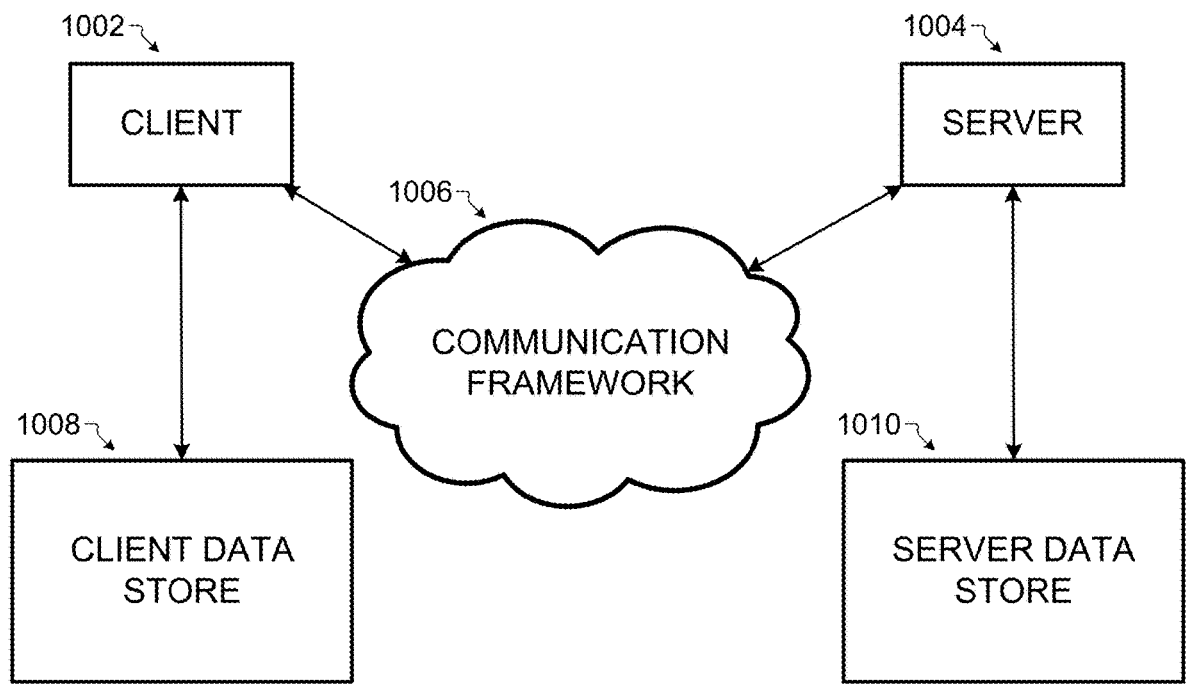
FIG. 10 illustrates a communication architecture.

FIG. 10 illustrates a block diagram of a communication architecture 1000. The communication architecture 1000 can implement various embodiments described herein. As shown in FIG. 10, the communication architecture 1000 comprises one or more clients 1002 and servers 1004. The client 1002 can represent an implementation of the computing device 104 and/or use of the computing device 104 to manage the cloud-based resources 108. One of the servers 1004 can represent an implementation of a device providing the web-based interface for managing the cloud-based resources 108 as described herein.

The client 1002 and the server 1004 can be operatively connected to a client data store 1008 and a server data store 1010, respectively, that can be employed to store information local to the respective client 1002 and server 1004. In various embodiments, the server 1004 can implement one or more of logic flows or operations described herein and/or any of the functions and features described in relation to the management of the cloud-based resources 108 as described herein.

The client 1002 and the server 1004 can communicate data or other information between each other using a communication framework 1006. The communications framework 1006 can implement any known communications technique or protocol. The communications framework 1006 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 1006 can operate over any communication media according to any networking technology including any wired or wireless communications standard or protocol, or any combination thereof.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A computing device, comprising:
   a storage device; and
   logic, at least a portion of the logic implemented in circuitry coupled to the storage device, the logic to:
      receive search criteria for cloud-based resources via a web-based user interface;
      receive a listing of cloud-based resources responsive to a search based on the received search criteria, the listing comprising a first cloud-based resource, an original operating schedule of the first cloud-based resource specifying to stop execution of the first cloud-based resource at a first time;
      display, on the web-based user interface, the listing of cloud-based resources;
      receive a first request via the web-based user interface, the first request to keep the first cloud-based resource awake past the first time;
      copy the original operating schedule for the first cloud-based resource into a first tag associated with the first cloud-based resource and store the first tag in the storage device;
      modify the original operating schedule contained within a second tag associated with the first cloud-based resource to form a modified operating schedule to keep the first cloud-based resource awake past the first time;
      execute the first cloud-based resource on at least one processor past the first time based on the modified operating schedule;
      receive a second request to restore the original operating schedule prior to expiration of a predetermined time period; and
      restore the original operating schedule for the first cloud-based resource based on receiving the second request prior to expiration of the predetermined time period.

2. The computing device of claim 1, wherein the search criteria comprises a primary tag value and a secondary tag value, wherein the modified operating schedule specifies to execute the first cloud-based resource until a second time, the second time subsequent to the first time, the logic further to:
   operate the first cloud-based resource according to the original operating schedule subsequent to restoring the original operating schedule.

3. The computing device of claim 1, wherein the listing of the cloud-based resources matching the received search criteria comprises an instance identifier, an instance name, a current operational state, and a schedule type for each cloud-based resource matching the search criteria.

4. The computing device of claim 1, wherein the logic transmits a command to start the first cloud-based resource if the first cloud-based resource is currently not running.

5. The computing device of claim 1, the logic to update a set of users when the original operating schedule is modified to form the modified operating schedule.

6. The computing device of claim 1, the logic to copy the original operating schedule from the second tag into the first tag responsive to the first request.

7. The computing device of claim 1, the logic to receive a primary tag value and a secondary tag value for each cloud-based resource through the web-based user interface.

8. A method, comprising:
   receive search criteria for cloud-based resources via a web-based user interface;
   receiving a listing of cloud-based resources responsive to a search based on the received search criteria, the listing comprising a first cloud-based resource, an original operating schedule of the first cloud-based resource specifying to stop execution of the first cloud-based resource at a first time;
   displaying, on the web-based user interface, the listing of cloud-based resources;
   receiving a first request via the web-based user interface, the first request to keep the first cloud-based resource awake past the first time;
   copying the original operating schedule for the first cloud-based resource into a first tag associated with the first cloud-based resource and store the first tag in a storage device;
   modifying the original operating schedule contained within a second tag associated with the first cloud-based resource to form a modified operating schedule to keep the first cloud-based resource awake past the first time;
   executing the first cloud-based resource on at least one processor past the first time based on the modified operating schedule;
   receiving a second request to restore the original operating schedule prior to expiration of a predetermined time period; and
   restoring the original operating schedule for the first cloud-based resource based on receiving the second request prior to expiration of the predetermined time period.

9. The method of claim 8, wherein the search criteria comprises a primary tag value and a secondary tag value, wherein the modified operating schedule specifies to execute the first cloud-based resource until a second time, the second time subsequent to the first time, the method further comprising:
   operating the first cloud-based resource according to the original operating schedule subsequent to restoring the original operating schedule.

10. The method of claim 8, wherein the displaying further comprises displaying an instance identifier, an instance name, a current operational state, and a schedule type for each cloud-based resource matching the search criteria.

11. The method of claim 8, further comprising issuing a command to start the first cloud-based resource if the first cloud-based resource is currently not running.

12. The method of claim 8, further comprising notifying a set of users when the original operating schedule is modified to form the modified operating schedule.

13. At least one non-transitory computer-readable medium comprising a set of instructions that, in response to being executed on a computing device, cause the computing device to:
   receive search criteria for cloud-based resources via a web-based user interface;

receive a listing of cloud-based resources responsive to a search based on the received search criteria, the listing comprising a first cloud-based resource, an original operating schedule of the first cloud-based resource specifying to stop execution of the first cloud-based resource at a first time;

display, on the web-based user interface, the listing of cloud-based resources;

receive a first request via the web-based user interface, the first request to keep the first cloud-based resource awake past the first time;

copy the original operating schedule for the first cloud-based resource into a first tag associated with the first cloud-based resource and store the first tag in a storage device;

modify the original operating schedule contained within a second tag associated with the first cloud-based resource to form a modified operating schedule to keep the first cloud-based resource awake past the first time;

executing the first cloud-based resource on at least one processor past the first time based on the modified operating schedule;

receive a second request to restore the original operating schedule prior to expiration of a predetermined time period; and restore the original operating schedule for the first cloud-based resource based on receiving the second request prior to expiration of the predetermined time period.

14. The at least one non-transitory computer-readable medium of claim 13, wherein the search criteria comprises a primary tag value and a secondary tag value, wherein the modified operating schedule specifies to execute the first cloud-based resource until a second time, the second time subsequent to the first time, the medium comprising instructions that response to being executed on the computing device, cause the computing device to:

operate the first cloud-based resource according to the original operating schedule subsequent to restoring the original operating schedule.

15. The at least one non-transitory computer-readable medium of claim 13, wherein the listing of the cloud-based resources matching the received search criteria comprises an instance identifier, an instance name, a current operational state, and a schedule type for each cloud-based resource matching the search criteria.

16. The at least one non-transitory computer-readable medium of claim 13, wherein the computing device transmits a command to start the first cloud-based resource if the first cloud-based resource is currently not running.

17. The at least one non-transitory computer-readable medium of claim 13, the computing device to copy the original operating schedule from the second tag into the first tag responsive to the first request.

* * * * *